United States Patent Office 3,114,873
Patented Dec. 17, 1963

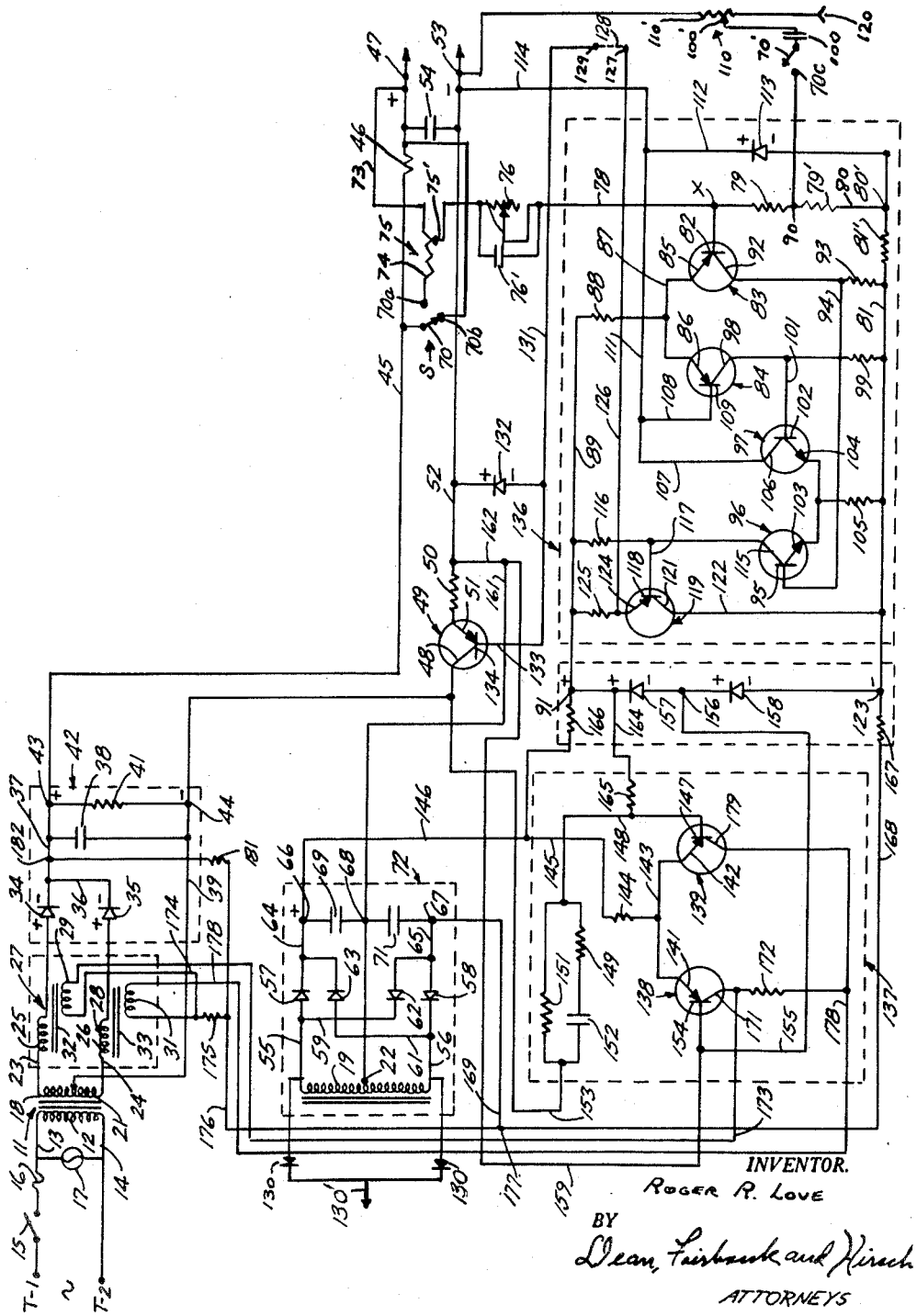

3,114,873
TRANSISTOR POWER SUPPLY
Roger R. Love, Florham Park, N.J., assignor to NJE Corporation, Kenilworth, N.J., a corporation of New Jersey
Filed June 12, 1961, Ser. No. 116,355
3 Claims. (Cl. 323—22)

As conducive to an understanding of the invention, it is noted that where a manufacturer of electronic equipment utilizes a laboratory type power supply as the power source for his equipment and specifies the output specifications of such laboratory type supply when he orders power supplies to be used in conjunction with such equipment, since the laboratory type power supply usually is a highly regulated low ripple source, the characteristics of the power supplies that he orders are often greater than required with resultant higher cost.

It is accordingly among the objects of the invention to provide a laboratory type power source which is of the highly regulated low ripple type and which may have such characteristics variable so that the manufacturer can readily determine the exact requirements of regulation and ripple needed for his equipment thereby enabling the manufacturer to specify the exact type of power source he needs which may be of lower performance and hence lesser cost than a laboratory type supply.

According to the invention these objects are accomplished by the arrangement and combination of elements hereinafter described and more particularly recited in the claims.

In the accompanying drawing in which is shown one of various possible embodiments of the several features of the invention, the single FIGURE is a circuit diagram of an illustrative embodiment of the invention.

Referring now to the drawings, the transistor power supply comprises a transformer 11 having a primary winding 12, the ends of which are connected by leads 13 and 14 to input terminals T1 and T2 to which a source of alternating current may be applied. An "on-off" switch 15 and fuse 16 are connected in series in lead 13, for example, and the lamp 17 is connected across leads 13, 14 to indicate when the power supply is energized.

The transformer 11 has two secondary windings 18 and 19, each center tapped as at 21 and 22. The ends of windings 18 are connected by leads 23, 24 to one end of the gate winding 25, 26 of an associated magnetic amplifier 27, 28, each of which also includes a control winding 29, 31 respectively, mounted on the same iron core 32, 33 respectively, changes in the current through windings 29, 31 correspondingly changing the inductance of the associated magnetic amplifier.

The other end of each of the gate windings 25, 26 is connected to the positive side of diode rectifiers 34, 35, the negative sides of said rectifiers being connected together by lead 36, which is connected by lead 37 to one side of a filter capacitor 38, the other side of said capacitor being connected by lead 39 to the center tap 21 of transformer winding 18, a bleeder resistor 41 being connected across said leads 37 and 39.

The components above described associated with transformer winding 18 and magnetic amplifiers 27, 28 define the main full wave power supply 42, an unregulated filtered D.C. voltage appearing across junctions 43, 44 defined by the ends of bleeder resistor 41, the voltage illustratively being positive at junction 43 and negative at junction 44.

The junction 43 is connected by lead 45 through a resistor 46 to positive output terminal 47, and the junction 44 is connected to the collector element 48 of series regulating transistor 49.

The emitter element 51 of transistor 49 is connected through resistor 50 and lead 52 to negative output terminal 53, an output capacitor 54 being connected across terminals 47 and 53.

The ends of the secondary winding 19 of transformer 11 are connected by leads 55, 56 to the positive and negative sides respectively of diode rectifiers 57, 58, and by leads 59 and 61 to the negative and positive sides of diode rectifiers 62 and 63. The negative sides of rectifiers 57 and 63 and the positive sides of rectifiers 58, 62 are connected together respectively, and then connected by leads 64, 65 to junctions 66, 67 respectively, with the center tap 22 of winding 19 being connected to junction 68, filter capacitors 69, 71 being connected between junctions 66, 68 and 67 and 68 respectively.

The components above described associated with winding 19 define the auxiliary full wave power supply 72, an unregulated filtered D.C. voltage appearing between junctions 66, 68 and 67, 68, junction 66 being positive with respect to common junction 68, and junction 67 being negative with respect to common junction 68.

Positive output terminal 47 is connected by lead 73 through the resistance 74 of a potentiometer 75 to fixed contact 70a of a switch S normally engaged by movable contact arm 70 when the wiper arm 75' of potentiometer 75 is spaced from the right hand end of resistance 74 thereof at which time at least a portion of the resistance 74 is in circuit. The contact arm 70 is connected to lead 45 on the left side of resistor 46, so that when any portion of resistance 74 is in circuit it will be in parallel with resistor 46.

A fixed contact 70b is adapted to be engaged by contact arm 70 when the wiper arm 75' of the potentiometer 75 is at the right hand end of the resistance 74 thereof as shown, at which time none of resistance 74 will be in circuit and fixed contact 70b is connected to lead 45 on the right side of resistor 46 to bypass the latter.

The wiper arm 75' is connected to one end of variable output resistor 76, the movable contact arm 77 of which is connected by lead 78 through resistor 79 and 79' and lead 80 to junction 80' to which one end of a resistor 81' is connected, and also to the base 82 of transistor 83, which together with transistor 84 forms a differential amplifier. A capacitor 76' is shunted across resistor 76 to bypass A.C. components.

The junction 90 between resistors 79 and 79' is connected to fixed contact 70c of switch S, the contact arm 70' of which is ganged to move in unison with contact arm 70 and which is normally spaced from fixed contact 70c when contact arm 70 is engaging fixed contact 70b and engages fixed contact 70c when contact arm 70 engages fixed contact 70a.

Contact arm 70' is connected through capacitor 100 to the wiper arm 100' of potentiometer 110, one end of the resistance winding 110' of which is connected to negative terminal 53 and the other end of which is connected to terminal 120 to which a suitable ripple source may be applied.

In the illustrative embodiment herein shown the ripple source is supplied from the secondary winding 19 of transformer 11. To this end, each end of said secondary winding is connected to the positive side of a diode 130, the negative sides of which are connected together and then connected by lead 130' to terminal 120.

Thus, assuming the frequency of the applied voltage is 60 cycles per second, 120 cycle ripple is applied to terminal 120.

The emitters 85, 86 of transistors 83, 84 are connected by lead 87 to one end of resistor 88, the other end of which is connected by lead 89 to junction 91. The collector 92 of transistor 83 is connected to one end of resistor 93, the other end of which is connected to the other end of resistor 81' and to lead 81. In addition, the collector 92 is connected by lead 94 to the base 95 of transistor 96, which together with transistor 97 also forms a differential amplifier. The collector 98 of transistor 84 is connected through resistor 99 to lead 81, and also by lead 101 to the base 102 of transistor 97.

The emitters 103, 104 of transistors 96, 97 are connected together and then are connected through resistor 105 to lead 81. The collector 106 of transistor 97 is connected by leads 107, 108 to the base 109 of transistor 84; by leads 107, 111, 112 to the positive side of a "Zener" reference diode 113, the negative side of which is connected to junction 86'; and by leads 107, 111 and 114 to negative output terminal 53.

The collector 115 of transistor 96 is connected through resistor 116 to lead 89 and through lead 117 to the base 118 of control transistor 119. The collector 121 of transistor 119 is connected by lead 122 to lead 81, said lead 81 being connected to junction 123.

The emitter 124 of transistor 119 is connected through resistor 125 to lead 89, and also through lead 126 to terminal 127, which is connected through jumper 128 to terminal 129, the latter being connected by lead 131 to the negative side of "Zener" reference diode 132, the positive side of which is connected to lead 52, and also by said lead 131 and lead 133 to the base 134 of series regulating transistor 49.

The transistors 83, 84, 96, 97 and 119 and associated components define an amplifier 136, which together with "Zener" reference diode 113 senses variations in the output voltage across terminals 47, 53 and regulates such output voltage by controlling the base drive of series regulating transistor 49 in the manner hereinafter to be described.

The magnetic amplifiers 27, 28 are arranged to control the magnitude of the voltage fluctuations across the series regulating transistor 49.

The magnetic amplifiers are in turn controlled by a differential amplifier 137 which comprises two transistors 138 and 139. The emitters 141, 142 of said transistors are connected together by lead 143, and then are connected through resistor 144 and leads 145, 146 to positive junction 66 of the auxiliary power supply 72.

The base 147 of transistor 139 is connected by lead 148 to one end of resistors 149 and 151. The other end of resistor 149 is connected to one side of a capacitor 152, the other side of said capacitor 152 and the other end of said resistor 151 being connected by lead 153 to the collector element 48 of transistor 49.

The base 154 of transistor 138 is connected by lead 155 to junction 156, which is connected respectively to the negative side of "Zener" reference diode 157 and to the positive side of "Zener" reference diode 158. In addition, base 154 is connected by leads 159 and 161 to common junction 68 of the auxiliary power supply 72, and by leads 159 and 162 to lead 52, which is connected through resistor 50 to the emitter 51 of the series regulating transistor 49.

Thus, variations in the potential across the series regulating transistor will determine the output of the differential amplifier 137.

The "Zener" reference diodes 157, 158 provide a regulated bias for the power supply. Thus, the positive side of diode 157 is connected to junction 91, and the negative side of diode 158 is connected to junction 123.

In addition, the positive side of diode 157 is also connected through lead 164 and resistor 165 to base 147 of transistor 139.

The junction 91 is connected through current limiting resistor 166 and lead 146 to positive junction 66 of the auxiliary power supply and junction 123 is connected through current limiting resistor 167 and leads 168, 169 to negative junction 67 of the auxiliary power supply.

The collector 171 of transistor 138 is connected to one end of resistor 172 and by lead 173 to one end of control winding 29 of magnetic amplifier 27. The other end of said winding 29 is connected by lead 174 to one end of the control winding 31 of magnetic amplifier 28 and through resistor 175 and lead 176 to junction 177 to which leads 168 and 169 are also connected, thence through resistor 181 to lead 37, as at 182.

The other end of control winding 31 of magnetic amplifier 28 is connected by lead 178 to the other end of resistor 172 and also to the collector 179 of transistor 139.

In the operation of the power supply, with the contact arms 70 of switch S engaging fixed contacts 70b at which time none of resistance 74 is in circuit and with contact arm 70' spaced from fixed contact 70c, the equipment will function as a highly regulated low ripple laboratory type power supply. When switch 15 is closed, a source of alternating current, which illustratively is 115 volts 60 cycle, is applied to the primary winding 12 of the transformer 11, the lamp 17 being illuminated to indicate that the power supply is turned on.

The secondary winding 18 of transformer 11 will apply such alternating current through the gate windings 25, 26 of magnetic amplifiers 27 and 28, to rectifier diodes 34 and 35, and in conventional manner unregulated D.C. potential will be provided, which will be filtered by capacitor 38 and appear across junctions 43 and 44 between which bleeder resistor 41 is connected. Due to the arrangement of the rectifier diodes 34, 35, which form a full wave rectifier, the junction 43 will be positive with respect to junction 44, which will be negative.

In addition, the secondary winding 19 of transformer 11 is connected to rectifier diodes 57, 58, 62 and 63 which form two full wave rectifiers, and in conventional manner an unregulated D.C. potential will be provided which, due to the arrangement of the rectifier diodes, will be positive at junction 66 with respect to common junction 68 and negative at junction 67 with respect to common junction 68, filter capacitors 69 and 71 being connected respectively between junctions 66, 68 and 67, 68.

At this time, assuming that series regulating transistor 49 is not conducting, there will be zero output across output terminals 47 and 53.

The characteristics of the "Zener" reference diodes 157 and 158 are such that the voltage across each diode is constant, independently of the current flow therethrough. Since the "Zener" diode 157 is connected between junctions 66 and 68 and the "Zener" diode 158 is connected between junctions 67 and 68, there will be fixed voltages across said diodes 157 and 158. The junctions 91 and 123 to which the "Zener" diodes are connected illustratively are positive and negative respectively, to provide a regulated bias voltage in the order of, say, plus and minus 18 volts respectively with respect to common junction 156 connected to common junction 68 of the auxiliary power supply 72. The purpose of the resistors 166, 167 is to limit the current flow through diodes 157 and 158 respectively, to protect such diodes.

The negative bias at junction 123 is applied through resistor 81' to the negative side of "Zener" reference diode 113 and from the positive side of said diode through leads 112, 114, 52, 162 and 161 to common junction 68. Due to the characteristics of the "Zener" diode 113, there will be a fixed voltage in the order of say, six volts across said diode. In addition, there will be a positive potential at junction 91 which will be applied through resistors 125, 116 and 88 to transistors 119, 96, 84 and 83.

The resistors 76 and 79 form a voltage divider from terminal 47 (initially at zero), through resistors 76, 79 and 79', junction 86', through "Zener" diode 113, leads 112, 114, 52, 162 and 161 to common junction 68. Thus, initially the base 82 of transistor 83 is negative with respect to common junction 68 and hence is negative with respect to the base 109 of transistor 84 which is connected to the positive side of the "Zener" reference diode 113.

Since there is a difference as above described between the voltages at the bases 82 and 109 of transistors 83, 84 which form part of a differential amplifier, the outputs at the collectors 92 and 98 of said transistors will differ. These outputs are connected respectively to the bases 95 and 102 of transistors 96 and 97.

Since there will be a difference in the drive applied to the bases of said transistors 96, 97, which also form part of a differential amplifier, there will be a current flow through the collector 115 of transistor 96, which will result in a drive to the base 118 of transisor 119. This increasing base drive to transistor 119 will cause an increase in the current flow therethrough, and since the emitter 124 of transistor 119 is connected by lead 126, terminal 127, jumper 128, terminal 129 and leads 131, 133 to the base 134 of series regulating transistor 49, the base drive of said transistor 49 will be increased to render it conductive. As a result, an output voltage will now appear between terminals 47 and 53.

As the output voltage across the terminals 47 and 53 increases, due to the action of the voltage divider 76, 79 and 79', the base drive of transistor 83 will get less and less negative. As a result, the difference between the voltages applied to the bases of transistors 83 and 84 will also get less, so that the output of transistor 83 at its collector 92 will tend to approach the output of transistor 84 at its collector 93. As a result, the difference between the base drives of transistors 96 and 97 will also decrease, as will the output at collector 115 of transistor 96 applied to the base of transistor 119. This will cause the current flow at the emitter 124 of transistor 119 to drop, so that the base drive of series regulating transistor 49 will also drop, resulting in a greater voltage drop across said transistor 49, thereby effecting a drop in the output voltage across terminals 47 and 53.

The output voltage will stabilize when junction "X," which is the output of the voltage divider 76, 79, 79' approaches the value of common junction 68, the output voltage being determined by the ratio of resistors 76 and 77, 79'.

It is to be noted that the series regulating transistor 49 will have variations in the voltage drop thereacross, which it is desirable to control. Thus, since the current through the transistor 49 is a function of the load and voltage across the output terminals 47, 53, if the output voltage is adjusted downwardly by varying resistor 76 and the current drain and input voltage are constant, the voltage drop across the series regulating transistor 49 will increase. By the formula $W=EI$, the heat dissipated by the transistor 49 will increase and, if too great, damage to the transistor will result. If the voltage drop across the transistor 49 is too low, it might not operate properly to control the output voltage.

To control the voltage drop across the series regulating transistor 49, the magnetic amplifier 27, 28 has been provided.

If the voltage across transistor 49 increases excessively, the base of transistor 139 will become negative with respect to the base of transistor 138 which is at common.

Transistors 138, 139, resistor 144 and resistor 172 form a differential amplifier. Due to the voltages applied to the bases of transistors 138, 139, there will be a variation in the current flow through the control windings 29 and 31 of magnetic amplifiers 27 and 28. As a result, there will be a change in the saturation of the cores 25, 26 of the magnetic amplifiers, or in the inductances thereof, which, if increased, will lower the voltage across capacitor 38, and hence between the junctions 43 and 44, so that the voltage across the series regulating transistor 49 will also be reduced, thereby maintaining the drop across the latter within desired limits.

If there is a short circuit across the output terminals 47, 53, there will be an increase in the base drive of transistor 49, and hence an increase in the current flow therethrough which, if not controlled, may injure or destroy transistor 49.

The "Zener" diode 132 has a threshold at which it starts to conduct. Thus, if there is a short circuit across the load, which tends to increase the base drive of transistor 49, there will be an increase in the current flow from emitter to base and from emitter to collector. The increase in the current through resistor 50 will increase the voltage across the resistor and hence across the "Zener" diode 132. Where there is sufficient voltage increase past the threshold of "Zener" diode 132, it will conduct, diverting part of the current from the base 134 of transistor 49 through "Zener" diode 132, hence limiting the base current of said transistor 49.

The limitation of the base current of transistor 49 limits the current from emitter to collector by increasing the voltage drop across the transistor 49. However, since the current through the transistor, though limited, is relatively high, since the voltage drop is high, such voltage must be reduced to prevent injury to the transistor due to excessive heat dissipation.

This reduction is accomplished by the circuit above described. Thus, the compensating action provided by the differential amplifier 138, 139 and magnetic amplifiers 27, 28 will cut the input voltage to the rectifier unit 42, and hence reduce the voltage drop across transistor 49, so that the resultant heat dissipation of transistor 49 will be maintained within tolerable limits.

The equipment above described may readily have the output voltage thereof determined by remote control by reason of the variable resistor 76, which may be at a considerable distance from the remaining portion of the unit, since only a relatively small current will flow through the resistor 76, in the order of say, 7 mils (resistor 76 has a value of 5,000 ohms across which a maximum of, say, 35 volts is applied).

When the manufacturer wishes to use the equipment so that he can determine the exact requirements of ripple and regulation he must have in a power supply to operate the equipment in conjunction with which a power supply is to be used, he need merely turn the knob (not shown) controlling potentiometer 75.

As soon as this knob is turned, contact arms 70 and 70' will engage fixed contacts 70a and 70c.

Assuming that the power supply is set to provide 10 volt output and resistor 46 is a one ohm, 5 watt resistor and the potentiometer has a resistance of 10 ohms, when contact arm 70 engages contact 70a, the resistor 46 and potentiometer 75 will be in parallel with each other and in series with positive output terminal 47.

Thus, if the basic impedance of the power supply is .001 ohm, an increase of one ampere in the output load current would only cause the output voltage to drop one mv., i.e., good regulation is provided.

With resistor 46 and potentiometer 75 in circuit, and with the wiper arm 75' of potentiometer 75, say, at the mid point of the resistance 74 (indicated on an associated dial not shown), with a one ampere load, since .1 of the current will flow through resistance 74, which has a value of 10 ohms as compared to one ohm for resistor 46, there would be a one-half volt drop across resistance 74 on each side of the wiper arm 75' thereof which would be added to the voltage divider network 76, 79 and 79'.

As a result, a one ampere increase in the load current would cause a .501 volt drop in the output voltage. The quality of the regulation can be further reduced by moving wiper arm 75' to the extreme left. At such time the voltage drop across resistance 74 would be one volt which would be added to the voltage divider network so that the output voltage would drop 1.001 volts with a one ampere increase in the load current thereby providing poor regulations.

If the manufacturer wishes to vary the ripple output, he need merely adjust potentiometer 110. Since the negative sensing terminal 53 is tied to center tap terminal 22 of transformer 11, there is a complete path for the ripple signal.

Based upon the setting of wiper arm 100' of potentiometer 110, a given amplitude of ripple is fed through blocking capacitor 100 and closed contacts 70', 70c to junction 90 of the voltage divider 76, 79, 79'.

When the wiper arm 100' is at the upper end of the potentiometer 110, it is effectively tied to the negative sensing terminal 53 and no ripple voltage is injected into the capacitor 100. Hence the system functions as an extremely low ripple supply. As the wiper arm is moved downwardly (by a suitable calibrated dial) the amount of ripple voltage fed to the capacitor 100 increases, which in turn supplies an increasing A.C. component to junction 90 of the voltage divider.

This A.C. voltage is superimposed on the reference voltage developed by diode 113 and both the reference voltage and the ripple voltage are applied to the base of transistor 83 so that the regulated output voltage will have the injected ripple frequency.

It is of course to be understood that any desired ripple frequency could be provided at terminal 120, the magnitude of the ripple being determined by the setting of potentiometer 110.

The equipment above described uses substantially standard components and by reason of the safety features above described will provide a regulated output voltage without likelihood of breakdown of the series regulating transistor, which is normally subject to extreme variations, as above set forth, and will also provide the manufacturer with an extremely flexible laboratory power source, the ripple and regulation characteristics of which may readily be varied as desired.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A transistorized power supply having an input to which a source of line voltage may be connected and a positive and negative output across which a load may be connected, a full wave unregulated power supply connected to said input and having a positive output connected to the positive output of said transistorized power supply and a negative output connected to the negative output of said transistorized power supply, a regulating transistor connected in series between the negative output of said unregulated power supply and the negative output of said transistorized power supply, a voltage divider connected across said transistorized power supply output, means controlled by variations in the voltage across said divider to control the voltage across said series regulating transistor correspondingly to control the output voltage, said transistorized power supply having a given output impedance, means to add impedance in series with said given output impedance, whereby with increase in current drawn by the load a voltage related to the value of the added impedance will be applied in series with the voltage across said divider, thereby varying the output voltage of the power supply with variations in the output load by an amount greater than the normal regulated output when only the normal output impedance of the power supply is present, said means comprising a resistor connected in series between the positive output of said unregulated power supply and the positive output of said transistorized power supply, a switch having a movable contact arm and two fixed contacts, said movable contact arm being connected between said resistor and the positive output of the unregulated power supply, one of said fixed contacts being connected between said resistor and the positive output of said transistorized power supply, a potentiometer having one end of its resistance connected to the other fixed contact and the other end of its resistance connected to the positive output of said transistorized power supply, said potentiometer having a wiper arm connected in series with said voltage dividers, whereby in one position of said wiper arm and said contact arm, none of the resistance of said potentiometer is connected in circuit and said resistor is bypassed so that said power supply functions as a conventional regulated power supply and in another position of said potentiometer and said contact arm, said resistor and the resistance of said potentiometer are connected in parallel and the amount of impedance added in series with the output impedance is dependent upon the position of the wiper arm of said potentiometer.

2. The combination set forth in claim 1 in which means are provided to inject an alternating current ripple voltage into the means controlled by variations in the voltage across said divider so that the regulated output voltage will have the injected ripple frequency.

3. The combination set forth in claim 1 in which the voltage divider comprises a resistor network across the output of said transistorized power supply, a differential amplifier is provided comprising a pair of transistors each having an emitter, a collector and a base, means to set the base drive on one of said transistors a predetermined amount, means determined by the voltage drop across a portion of said resistor network of said voltage divider to set the base drive of the other of said transistors, whereby the difference between the outputs of the collectors of said transistors will be directly related to the difference between said base drives and means determined by the difference between said collector outputs to determine the voltage drop across said series regulating transistor, said means to set the base drive on one of said transistors to a predetermined amount comprising a "Zener" reference diode which provides a reference voltage and means to superimpose on said reference voltage an alternating current ripple voltage, whereby the regulated output voltage will have the injected ripple frequency.

References Cited in the file of this patent
UNITED STATES PATENTS
2,903,640   Bixby _____ Sept. 8, 1959